United States Patent Office 3,446,579
Patented May 27, 1969

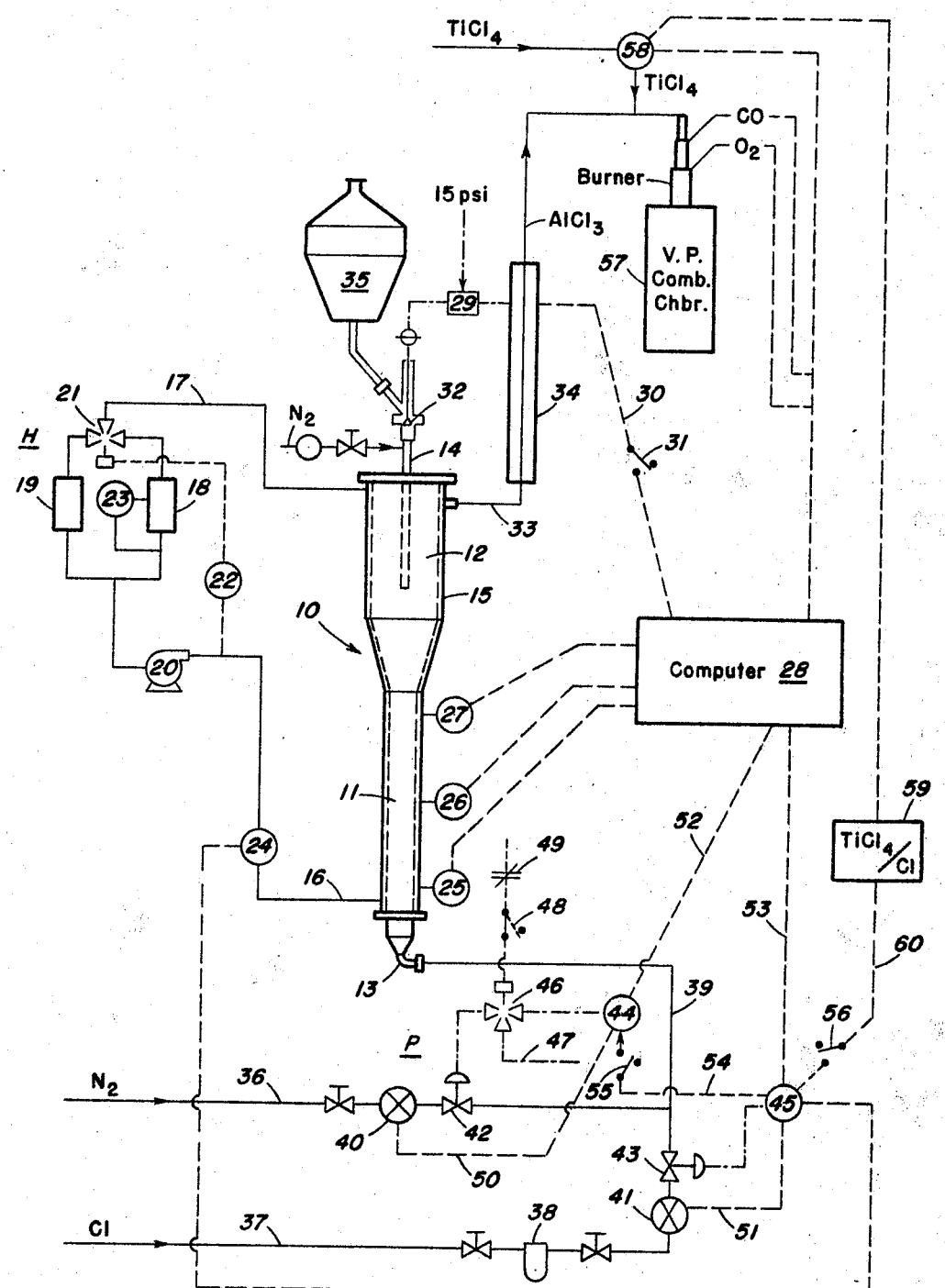

3,446,579
PROCESS FOR CONTINUOUSLY PRODUCING GASEOUS ALUMINUM CHLORIDE
Robert D. Toomey, Little Silver, and George Vassil, Old Bridge, N.J., assignors to National Lead Company, New York, N.Y., a corporation of New Jersey
Filed Dec. 23, 1966, Ser. No. 604,389
Int. Cl. C01f 7/58; C09c 1/64
U.S. Cl. 23—93                                   6 Claims

ABSTRACT OF THE DISCLOSURE

Disclosed and illustrated below is a generator for producing a gaseous metal halide wherein a pulverulent metal is reacted with a gaseous halide in a fluidized-bed of inert material the feed rate of the pulverulent metal to the generator being regulated through the instrumentality of temperature measuring probes, located at strategic places in the generator bed, and a computer which maintains constant surveillance of the temperature profile in the bed, so that the reaction zone is maintained within the middle and top third of the bed, the halide feed being part of a pipe-line complex including an inert gas which may be used solely or with the halide gas during start-up and shut-down to maintain the bed fluidized.

Background of invention

The invention would appear to be classifiable in the chemical art and in particular in the patent art relating to chemical generators.

Early in the development of the so-called vapor phase process for producing pyrogenic $TiO_2$ pigment, it was discovered that the addition of vaporous aluminum chloride to the reactants was essential to the production of a rutile $TiO_2$ pigment of optimum pigmentary properties. As a consequence much time and effort has been expended in the development of a commercially feasible process for producing vaporous aluminum chloride. Earlier methods include treating dehydrated aluminum sulfate with a chloride, U.S. 1,646,733, Oct. 25, 1927 and passing chlorine over a molten zinc-aluminum alloy U.S. 3,152,864 Oct. 13, 1964. Also attempts have been made to subject a static or fluidized bed of aluminum metal to a stream of gaseous chlorine or chlorine containing gases. However many difficulties were encountered due primarily to the exothermic nature of the reaction which lead to serious overheating of the bed causing fusing and erratic generation of aluminum chloride.

In an effort to overcome the problem of overheating, inert particulate materials have been added to the bed of aluminum metal and the gaseous chlorine has been diluted with large volumes of an inert gas. The resulting dilution of both reactants in this way has necessitated the use of relatively large and prohibitively expensive equipment. Still other attempts to obtain commercially feasible rates of production without overheating the bed include mainaining a fluidized bed of aluminum metal using large volumes of inert gas or a mixture of chlorine and an inert gas, and introducing the gas into the bed at points remote from the zone-bounding walls of the bed. Again relatively large volumes of inert gas were used thereby limiting the efficiency and productivity of the process.

Summary of invention

In brief the invention relates to improved method and means for producing vaporous metal halides efficiently at accurately controlled rates and on a commercial scale by reacting a gaseous halide with a pulverulent metal in a fluidized bed of inert material wherein the temperature profile of the bed is used in conjunction with computer monitoring means to automatically control the rate of feed of the metal to the bed such that no overheaing of the bed, fusing of the metal and/or sintering of the bed occurs the invention being especially adapted to the production of vaporous aluminum chloride for use in conjunction with a system for continuously producing pyrogenic titanium dioxide pigment by the vapor phase reaction of titanium tetrachloride and oxygen in the presence of vaporous aluminum chloride wherein the rate of production of the vaporous aluminum chloride is automatically controlled so as to maintain a predetermined ratio with the rate of production of the titanium dioxide.

Description of drawings

The drawing shows schematically the novel metal halide generator of this invention including computer monitoring means, a burner for producing pyrogenic $TiO_2$ pigment, and the electrical and pneumatic circuitry for operatively relating the several components to each other.

Detailed description

Broadly, the process of the instant invention relates to the production of a metal halide by maintaining a fluidized bed of an inert particulate material, feeding a powdered metal to the fluidized bed, feeding a gaseous halide to the bed while maintaining the temperature of the bed sufficiently high to react the halide with said powdered metal and form a vaporous metal halide, but below the sintering temperature of said bed and/or said powdered metal, continuously measuring the temperature of the fluidized bed at a plurality of check points during production of said vaporous metal halide and regulating the rate of feed of said powdered metal to said fluidized bed in accordance with the temperatures at said check points so as to maintain the reaction of said metal with the gaseous halide within a prescribed zone in said bed.

While the invention is applicable, in general, to the halogenation of powdered metals such as titanium, aluminum, zirconium and the like, the invention is directed particularly to measures for maintaining preceise control of the halogenation of a metal wherein the reaction is exothermic in nature. Hence it is especially adapted to the production of vaporous aluminum chloride by reacting gaseous chlorine with solid particulate aluminum metal, the reaction being maintained in a reaction zone which, as hereinafter described, constitutes a relatively small portion of the entire fluidized bed of particulate inert material so as to insure complete control of the reaction at all times. Moreover, because the process of this invention insures the production, at precisely controlled rates, of high purity vaporous aluminum chloride its use in conjunction with vapor-phase systems for the production of pyrogenic $TiO_2$ pigment constitutes a new and extremely valuable contribution to the art of pyrogenic $TiO_2$ pigment manufacture.

In the particular embodiment of the invention illustrated herein the inert particulate material used to form the fluidized bed may be an oxide of aluminum, known commercially as Alundum, a silica, or mixtures thereof, a preferred silica being a sand known commercially as Ottawa sand which comprises smooth, well-rounded particles having a particle size in the range of about +40 to +60 by Tyler screen analysis. This inert bed material, hereinafter referred to as sand, is contained within a generator which, as shown in the drawing, comprises a casing 10 having a cylindrical bottom-section 11 and an enlarged cylindrical top-section 12 the latter serving as a plenum chamber in which solid particulate materials may be separated by gravity from the vaporous products of the reaction as more fully described below.

An inlet pipe 13 is provided in the bottom section 11 for introducing a fluidizing gas or gases into the bottom of the generator; and a feed pipe 14 extends down into the plenum chamber 12 for feeding powdered aluminum metal into the top of the generator. In this connection the feed pipe 14 may be heated electrically and also purged with an inert gas to prevent plugging by sublimation of $AlCl_3$ therein. The generator is charged with sand to form a bed the depth of which, prior to fluidization, approximates one half the height of the bottom-section 11 and when fluidized fills about two thirds of the bottom-section 11. The bed of sand is adapted to be fluidized, during normal operation, by a single gas i.e. gaseous chlorine, but may also be fluidized by a combination of gases i.e. chlorine and an inert gas or by an inert gas alone as the circumstances may require. During normal operation of the generator gaseous chlorine serves both as a reactant and as a fluidizing gas, thereby reducing if not actually eliminating the need for an inert gas and hence minimizing the amount of inert gas in the product gases. However, during low operating rates i.e. both when initiating and terminating the operation of the generator, an inert gas alone or a mixture of inert gas and chlorine may be used to maintain the bed fluidized thereby conserving the use of chlorine. As will be explained hereafter this expedient is especially significant in preventing overheating of the bed during start-up and shut-down.

During normal operation of the generator chlorine gas is fed from a supply source (not shown) through a pipe line complex indicated generally at P and hereinafter described, into the bottom section 11 of the generator via the inlet pipe 13 the flow rate of chlorine being sufficient to fluidize the bed of sand thereby insuring good heat distribution throughout the bed. As the chlorine passes up through the fluidized bed of sand contact with aluminum metal in the bed will produce vaporous aluminum chloride, provided the temperature of the bed is sufficiently high. While the heat required to initiate the reaction between the chlorine and metallic aluminum may be provided by preheating the chlorine and/or metallic aluminum a preferred expedient is the one used in the present invention wherein the generator is surrounded with a jacket 15 having an inlet pipe 16 and outlet pipe 17 for circulating a heat transfer medium through the jacket. The heat transfer medium is chlorinated biphenyl known commercially as Therminol and is adapted to be circulated through a closed circuit which includes the aforesaid jacket 15 and a heat exchanger indicated generally at H in the drawing. The heat exchanger H serves to heat the Therminol sufficiently so that in circulating through the manifold of the generator it will transmit sufficient heat to the bed both to initiate the reaction of the chlorine and aluminum metal at start-up and thereafter prevent condensation of the aluminum chloride in the bed; and also to remove heat from the fluidized bed during normal operation of the generator and at shut-down so as to preclude fusing of the bed and/or sintering of the aluminum metal. To these ends the heat exchanger H comprises a gas-fired heater 18, a cooling unit 19, a pump 20 by which the Therminol is circulated through the jacket 15, and a temperature controlled selector valve 21 for sending the Therminol leaving the jacket via the outlet pipe 17 to either the cooling unit 19 or the heater 18 depending upon the reading of a temperature responsive instrument 22 connected between the selector valve 21 and the pipe line 16. The heat exchanger system also includes a temperature responsive device 23 for regulating the temperature of the heater 18 and, as a safety device, a low-flow detector 24 connected electrically to the chlorine feed controller hereinafter described to automatically shut off the chlorine feed to the generator in the event the flow of Therminol is low or interrupted.

At start-up the temperature of the Therminol is raised to 400–450° F. which is generally sufficient to heat the sand enough to initiate the reaction of the chlorine and aluminum metal and high enough to prevent condensation of the gaseous aluminum chloride in the bed. After the reaction has been started the exothermic nature of the reaction provides more than enough heat to maintain the reaction. It has been found that during normal operation of the generator the wall-temperature of the generator and/or the temperature of the fluidized sand should not exceed 900° F. and to this end the temperature of the Therminol being circulated through the manifold is not allowed to go above about 425° F.

As mentioned at the outset the reaction of the aluminum and chlorine is maintained within a relatively limited zone in the fluidized bed which, in the preferred embodiment of the invention, is between the middle and upper third of the bed which is tantamount to saying that the chlorine gas is adapted, normally, to pass upwardly through the bottom third of the bed without contacting aluminum metal and only contacts aluminum metal in the middle and/or top third of the bed at which zone the chlorine reacts with the aluminum to produce gaseous aluminum chloride. Since the reaction is exothermic in nature the relatively high temperatures which characterize the reaction are indicative of the reaction zone in the bed and can be readily pinpointed by thermocouples placed at strategic points in the bed. Referring to the drawings the generator is shown provided with a plurality of thermocouple wells 25, 26, and 27 respectively, mounted at substantially equally spaced points vertically in the wall of the generator, each well having a thermocouple therein for measuring the bed temperature at the corresponding check-point in the bed. The several thermocouples thus provide means for monitoring the temperature profile of the bed.

Pursuant to the further objects of the invention each of these thermocouples is connected by electric circuitry including computer-means 28, and pneumatically operated valve means 29 connected electrically to said computer-means via circuitry 30 and switch 31 for actuating the feed-valve 32 which regulates the rate of feed of the powdered aluminum to the generator whereby, during normal operation of the generator, the reaction between the chlorine and aluminum is maintained in the aforesaid restricted reaction zone in the fluidized bed. By way of explanation, taking cognizance of the fact that chlorine enters the bottom of the fluidized bed and the aluminum at the top it will be evident that if the aluminum feed rate is such as to provide a high concentration of aluminum in the lower regions of the bed the reaction zone will move down in the bed whereas if the aluminum feed rate is adjusted so that the aluminum is concentrated in the upper regions of the bed the reaction zone will move up in the bed; and that by providing vertically spaced thermocouples in the bed for constantly measuring the temperature at corresponding check points therein the location of the reaction zone in the bed can be accurately pinpointed. The computer-means 28 is designed to constantly evaluate the temperature of the bed at the several check-points therein and through circuitry 30 (switch 31 being closed) and pneumatic valve 29 the computer effects any necessary change in the operation of the aluminum feed-valve 32 and hence the rate of feed of aluminum so as to maintain the reaction within the prescribed zone in the bed. Thus the generation of vaporous aluminum chloride is accurately controlled and over-heating of the generator and/or sintering of the bed is avoided. The vaporous aluminum chloride exits from the plenum chamber 12 via outlet pipe 33 which is preferably heated by an electrical heater 34 to prevent sublimation of the $AlCl_3$ in the outlet pipes.

Referring again to the drawing the powdered aluminum is fed into the top of the generator from a hopper 35 via the valve 32 and feed-pipe 14. As pointed out above the valve 32 is adapted to be actuated by the computer-controlled pneumatic valve 29. In this connection it is essential to the successful operation of the generator that the aluminum feed be accurately controlled by using a feed valve which is not subject to plugging, blinding or other malfunctioning. This is especially significant when feeding a malleable metal such as powdered aluminum which is very prone to smear when caught between the mutually engaging metal surfaces of ball, gate-type or rotary valves of conventional design. Hence the feed-valve 32 is one which is especially designed for feeding powdered aluminum to the generator and is described in detail in co-pending application Ser. No. 556,515 filed June 9, 1966 the latter application and the instant application both being owned by a common assignee.

It will be evident that the production of the aluminum chloride is governed both by the rate of chlorine feed and the rate of aluminum feed. However since the rate of feed of the aluminum is controlled by the computer in response to the temperature profile of the fluidized bed and the temperature profile is, in turn dependent directly on the rate of feed of the chlorine, it follows that an increase or decrease in the chlorine feed rate effects a change in the aluminum feed rate.

The description this far has related to the normal operation of the generator during which chlorine gas is fed into the bottom of the generator at substantially uniform rate. However, as mentioned at the outset the invention also contemplates using an inert gas, such as nitrogen, in conjunction with the chlorine for fluidizing the inert bed material, particularly at start-up and shut-down, to prevent overheating the bed. This is accomplished by providing separate but interrelated means, described in detail below, for controlling the flow rates of the chlorine and the inert gas, respectively, the chlorine flow control means being direct-acting and the inert gas flow control means being reverse-acting so that as the chlorine flow rate is increased the flow rate of the inert gas is decreased-whereby the flow of either gas alone, or a mixture of the gases, to the reactor is always substantially constant such as to assure good fluidization of the bed and minimum solid particle carry-over with the gaseous aluminum chloride.

The actual superficial velocity of these gases for any generator will depend upon a multiplicity of factors including the size of the generator, volume change of the gases due to the chlorine reaction, pressure and temperature conditions in the generator and the like. However, an arbitrary superficial gas velocity can be calculated for any generator on the basis of its cross sectional area and the volume of the gas passing through it in a given time-using the following equation:

$$\frac{h+n}{a \times 60 \text{ sec.}} = k/\text{min.}$$

where:

$h$=SCFM chlorine (70° F. and 1 atm. pressure)
$n$=SCFM inert gas (70° F. and 1 atm. pressure)
$a$=cross sectional area of generator in sq. ft.
$k$=superficial velocity in ft./sec.

Using the above formula a satisfactory range for the gas flow constant $k$, using the generator described herein, is from 0.4 to 1.5 ft./sec. with a preferred range of from 0.5 to 0.8 ft./sec.

As shown in the drawings this relationship between the flow rates of the chlorine and inert gas is achieved by providing a pipe-line complex indicated at P which includes separate feed lines 36 and 37 for the inert gas and chlorine gas respectively, the latter being provided with a dessicant dryer 38 of conventional design to remove any moisture from the chlorine; and instrumentation for each feed line for controlling the flow of gases in accordance with the above formula. To this end feed lines 36 and 37 respectively feed into a single feed pipe 39 connected to the inlet 13 of the generator. Further, each feed line 36 and 37 is provided with a flow rate transmitter 40 and 41 respectively connected in the corresponding feed line in front of a pneumatically actuated flow control valve 42 and 43 respectively. The actuation of each flow control valve is regulated in turn, by a controller 44 and 45 respectively the former being a reverse-acting controller and the latter a direct-acting controller.

While the chlorine flow control valve 43 is actuated pneumatically directly by its controller 45 the flow control valve 42 for the inert gas is operated pneumatically by its controller 44 but indirectly in order to introduce a time delay during shut-down as hereinafter described. To this end a 3-way electrically operated solenoid valve 46 is interposed between the inert gas flow control valve 42 and its controller 44, air at superatmospheric pressure i.e. 15 p.s.i.g. being supplied to the 3-way valve both from the controller 44 and a second source indicated by the pipe line 47. Normally the 3-way valve 46 is energized electrically to automatically actuate the inert gas flow control valve 42 but it may be deenergized by opening a switch 48 interposed between the solenoid operated valve 46 and its time delay relay 49 to allow flow control valve 42 to be operated manually during start-up and shut-down. Turning again to the flow rate transmitters 40 and 41 these are connected electrically by circuitry 50 and 51 to the corresponding flow controllers for constantly transmitting the flow rates of the chlorine and inert gas thereto; and the flow controllers are in turn, connected by circuitry 52 and 43 to the digital computer 28 to transmit these flow rate signals thereto. The computer 28 compares the inert gas and chlorine flow signals and alarms for an adjustment in the flow rates in the event they do not conform to the flow-rate equation set forth above. This is accomplished by sending a signal to the flow controller 45 which actuates the chlorine flow control valve 43 and also, through its electrical connection 54 (switch 55 being closed) to the inert gas flow controller 44, energizes the latter which in turn actuates the inert gas control valve 42. Since the latter is reverse-acting the adjustment is reverse to that of the chlorine flow controller 45. Thus when the chlorine flow controller actuates the chlorine flow valve 43 to increase the flow of chlorine the inert gas flow controller 44 will operate the flow valve 42 to reduce the flow of inert gas, and vice versa, the change in relative flow rates being always in accordance with the equation set forth above.

Both the inert gas and chlorine are supplied to their respective feed lines from sources (not shown) at pressures sufficient to feed a single gas or a mixture of the gases to the generator at a superficial velocity within the range hereinabove defined, the selection of a single gas or a mixture of gases being accomplished, normally, automatically by the respective flow controllers 44 and 45 as hereinabove described. When the generator is not operating normally i.e. during start-up or shut-down proper settings of the flow control valves for varying the ratio of the inert gas and chlorine is preferably done manually, in which case switches 48, 55 and 56 are opened.

From the foregoing description it will be seen that during normal operation both the feed rate of the aluminum metal to the generator and the feed rate of the inert gas, when used, are both dependant, directly or indirectly as the case may be, on the flow rate of the chlorine. As explained below the process of this invention thus adapts itself especially well for use in conjunction with a vapor phase process for producing pyrogenic $TiO_2$.

Vapor phase processes are, of course, well known and fall into two general classes, the one in which oxidation of the $TiCl_4$ is carried out in a heated fluidized bed of inert material and/or $TiO_2$; and the other in which the gaseous reactants are fed through concentric tubes into a heated reaction chamber. In the latter case the aluminum chloride may be introduced into the reaction chamber through a separate tube but is generally admixed with the gaseous $TiCl_4$ just prior to feeding the latter into the reaction chamber.

The present invention has been found especially successful when used in conjunction with a vapor phase system of the latter type typical of which is that indicated schematically in the drawing at 57.

As disclosed in the literature a preferred ratio of aluminum chloride to vaporous $TiCl_4$ is used to insure the production of a pyrogenic rutile $TiO_2$ having optimum pigmentary properties and consequently it is essential to a continuous process for the production of high quality pyrogenic $TiO_2$ pigment that the production of aluminum chloride be continuous and moreover, that the rate of production of aluminum chloride bear a predetermined relationship to the rate at which the vaporous $TiCl_4$ is converted to pyrogenic $TiO_2$.

As explained above the rate of production of the aluminum chloride according to the present invention is determined ultimately, by a single parameter namely the chlorine feed rate, and hence it is that by relating the latter to the rate of conversion of gaseous $TiCl_4$ to pyrogenic $TiO_2$ the gaseous aluminum chloride will be generated at a rate such as to maintain the proper ratio of aluminum chloride to $TiCl_4$ for producing pyrogenic $TiO_2$ of optimum pigmentary properties. Suitable means for relating the chlorine feed rate to the rate of conversion of $TiCl_4$ to $TiO_2$ comprises a flow measuring device indicated at 58 adapted to continuously monitor the flow rate of $TiCl_4$ and to energize suitable ratio-control means 59 which is connected electrically by circuitry 60 (switch 56 being closed) to the chlorine controller 45 to alter the setting of the feed valve 43 accordingly. Thus any fluctuations or variations in the conversion rate of the vaporous $TiCl_4$ will effect an immediate adjustment in the flow rate of the gaseous chlorine to the aluminum chloride generator. This adjustment produces a corresponding change in temperature profile of the fluidized bed which, in turn, is detected by the above described computer monitoring-means to effect a compensating change in the rate of flow of powdered aluminum metal to the generator. Thus, the aluminum chloride is constantly generated at a rate which bears a proper ratio to the rate of feed of the $TiCl_4$ to the reactor so as to produce a pyrogenic $TiO_2$ pigment of optimum pigmentary properties; while the rate of feed of the aluminum metal to the aluminum chloride generator is also maintained in a proper ratio to the chlorine thereby restricting the reaction to a limited zone in the bed and hence preventing overheating and/or sintering of the bed.

While the operation of the generator is believed to be clear from the foregoing description the following examples may serve to illustrate the invention further. Referring to the drawing the generator 10 was filled up to about 50–70% of its height with a bed material comprising about 95% sand and 5% powdered aluminum metal; and the heat-exchanger H, which is used to vary the temperature of the Therminol circulating through the jacket of the generator, was set to raise the temperature of the Therminol to 450° F. so as to heat the fluidized bed to a temperature sufficient to initiate reaction of the aluminum metal with chlorine gas and prevent condensation of the aluminum chloride in the bed. At start-up the chlorine feed valve 43 was closed, manually (switch 56 being open), and the feed valve for the inert gas, which in this case was nitrogen, was automatically adjusted by means of circuitry 54, controller 44 and 3-way valve 46 to meter the nitrogen into the generator at a superficial velocity of about 0.50 ft./sec. The pressure drop across the fluidized bed was constant and the bed had a pressure fluctuation of about 0.5° p.s.i.g. amplitude. After 2 minutes, and while still using manual control, the chlorine feed valve was opened to feed and amount of chlorine to the bed such as to provide a gas mixture comprising substantially 28.5% chlorine and 71.5% nitrogen the flow rate of the nitrogen being automatically reduced so that the superficial velocity of the gas mixture through the bed remained substantially constant at 0.5 ft./sec. Monitoring of the thermocouple at check point 25 in the bed showed a temperature of about 550° F. which indicated the presence of aluminum in the bottom of the bed. Hence, the chlorine feed was continued but the aluminum feed from hopper 35 was not started until the monitoring means showed a reduction in temperature at the bottom of the bed to about 500° F. and an increase in temperature to about 575° F. in the middle and upper third of the bed. The average temperature in the middle and upper third of the fluidized bed of the inert material is maintained within the range of from 525° F. to 675° F. Thereupon the chlorine feed rate and the aluminum feed rate were adjusted manually until the generation of aluminum chloride was in the desired ratio to the rate of conversion of $TiCl_4$ to $TiO_2$. At this point the switch 56 was closed to place the chlorine feed valve under automatic control, as hereinabove described, and at the same time the switch 31 was closed to put the aluminum feed-means under computer control. The aluminum chloride generator was then operated entirely automatically, the chlorine feed rate being set automatically by the ratio of aluminum chloride to $TiCl_4$ and the aluminum feed rate being adjusted automatically by the computer in accordance with variations in the temperature profile of the bed.

Under these conditions the generator was operated successfully during two production runs of pyrogenic $TiO_2$ pigment, one run being at the rate of 15 tons of $TiO_2$ per day during which the superficial velocity of the chlorine gas through the generator as determined by the equation set forth above, was about 0.561 ft./sec. and the temperature in the middle and upper third of the generator bed was about 600° F.; and a second run at the rate of 20 tons of pyrogenic $TiO_2$ pigment per day during which the superficial velocity of the chlorine was 0.568 ft./sec. The temperature at the middle and upper third of the generator bed being maintained at about 650° F.

Following these runs the generator was shut down by first switching the aluminum feed to manual control and shutting it off. The chlorine feed was left on until the temperature profile of the bed indicated substantially all of the aluminum to be depleted and then the chlorine feed was switched to manual control and shut off. The nitrogen feed rate was increased to maintain a superficial velocity of 0.50 ft./sec. through the bed. The latter was held in this state for 5 minutes during which the bed cooled and was purged of residual $AlCl_3$ and $Cl_2$. After 5 minutes the time delay switch 49 in the circuitry to the 3-way solenoid operated valve 46 opened thereby automatically closing the nitrogen flow control valve 42.

From the foregoing description and example it will be evident that the instant invention provides a new and novel method and means for producing a metal halide and in particular aluminum chloride in a fluidized bed-type generator in a manner which precludes fusing and/or sintering of the bed, which insures the production of aluminum chloride of uniform quality accompanied by minimum dilution by inert gases and which is characterized by novel temperature responsive controls which insure maximum economy and efficiency of operation as well as adaptability to a continuous process for producing pyrogenic $TiO_2$.

The invention may be carried out in other specific ways than those herein set forth without departing from the spirit and essential characteristics of the invention and the present embodiments are, therefore, to be considered in all respects as illustrative and not restrictive, and all changes coming within the meaning and equivalency range of the appended claims are intended to be embraced therein.

We claim:
1. A continuous process for producing gasous aluminum chloride which comprises the steps of: providing a bed of inert particulate material, feeding chlorine gas and an inert gas upwardly into said bed of inert particulate material from the bottom thereof at linear velocities sufficient to fluidize said bed, monitoring the flow rates of said chlorine gas and said inert gas and automatically controlling said flow rates of the respective gases in response to said monitoring $$\frac{h+n=k/\text{min.}}{a \times 60 \text{ sec.}}$$

where:

$h$=SCFM chlorine (70° C. and 1 atm. pressure)
$n$=SCFM of the inert gas (70° C. and 1 atm. pressure)
$a$=cross-sectional area of the aluminum chloride generator in square feet
$k$=0.4 to 1.5 feet/sec.

feeding finely divided aluminum metal into the top of said fluidized bed of inert material, maintaining the temperature in said fluidized bed sufficiently high to effect reaction of said chlorine gas with said aluminum metal but below the sintering temperature of said aluminum metal, and automatically controlling the rate of feed of said finely divided aluminum metal to said bed in response to variations in feed rate of said chlorine gas so as to confine the reaction of said finely divided aluminum metal and said chlorine to a finite zone located at the middle to upper third of said bed and wherein the rate of feed of said finely divided aluminum metal is automatically controlled by maintaining constant surveillance of the temperature at vertically spaced points in said bed, and monitoring changes in temperature at said vertically spaced points due to changes in feed rate of said chlorine gas, and automatically activating aluminum feed control means in response to said monitoring.

2. A continuous process for producing gaseous metal halide according to claim 1 wherein the inert particulate material of said fluidized bed is sand and said inert gas is nitrogen.

3. A continuous process for producing gaseous aluminum chloride according to claim 1 wherein the temperature of said fluidized bed is maintained sufficiently high to effect reaction of said chlorine gas with said finely divided aluminum metal but below the sintering temperature of said aluminum metal by maintaining a heat exchange medium in heat exchange relationship with said bed, and automatically controlling the temperature of said heat exchange medium by constantly monitoring the temperature of the heat exchange medium leaving said bed and by-passing said heat exchange medium through heating means and cooling means, as the case may be, in response to said monitoring.

4. A continuous process for producing gaseous aluminum chloride according to claim 1 wherein the monitoring of the flow rates of said chlorine and said inert gas, and the monitoring of the temperatures at vertically spaced points in said bed are computerized to effect said respective controls.

5. A continuous process for producing gaseous aluminum chloride according to claim 1 wherein the average temperature in the middle to upper third of said fluidized bed of inert material is maintained within the range of from 525° F. to 675° F.

6. In a continuous process for producing pyrogenic rutile $TiO_2$ pigment by the vapor phase reaction of gaseous $TiCl_4$ and oxygen in the presence of gaseous aluminum chloride the improvement comprising: producing said gaseous aluminum chloride continuously according to the process of claim 1, continuously monitoring the rate of conversion of said $TiCl_4$ to $TiO_2$ and computerizing the monitoring of the flow rate of said chlorine and the monitoring of the conversion rate of said $TiCl_4$ to $TiO_2$ to generate $AlCl_3$ at a rate to maintain a predetermined ratio of $AlCl_3$ to $TiCl_4$.

References Cited

UNITED STATES PATENTS

| 2,819,946 | 1/1958 | Ramamurthy | 23—87 |
| 2,828,187 | 3/1958 | Evans et al. | 23—202 |
| 2,858,189 | 10/1958 | Globus | 23—87 |
| 3,058,817 | 10/1962 | Irani | 23—87 XR |
| 3,097,923 | 7/1963 | Arkless | 23—87 XR |
| 3,222,127 | 12/1965 | Wilson | 23—93 |
| 3,343,911 | 9/1967 | Eisenlohr | 23—87 XR |
| 3,069,282 | 12/1962 | Allen | 23—202 XR |

EDWARD STERN, Primary Examiner.

U.S. Cl. X.R.

23—87, 202; 106—300